United States Patent
Luo (10) Patent No.: US 10,014,030 B2
(45) Date of Patent: Jul. 3, 2018

(54) METHOD, DEVICE AND SYSTEM FOR PLAYING VIDEO

(71) Applicant: TENCENT TECHNOLOGY (SHENZHEN) COMPANY LIMITED, Shenzhen, Guangdong (CN)

(72) Inventor: Shaohua Luo, Shenzhen (CN)

(73) Assignee: TENCENT TECHNOLOGY (SHENZHEN) COMPANY LIMITED, Shenzhen, Guangdong Province (CN)

(*) Notice: Subject to any disclaimer, the term of this patent is extended or adjusted under 35 U.S.C. 154(b) by 0 days.

(21) Appl. No.: 15/172,250

(22) Filed: Jun. 3, 2016

(65) Prior Publication Data

US 2016/0284382 A1    Sep. 29, 2016

Related U.S. Application Data (63) Continuation of application No. PCT/CN2015/072133, filed on Feb. 3, 2015.

(30) Foreign Application Priority Data

Dec. 4, 2013 (CN) .......................... 2013 1 0646296

(51) Int. Cl.
  *G11B 27/00* (2006.01)
  *H04N 5/93* (2006.01)
  *G11B 27/034* (2006.01)
  *H04N 21/431* (2011.01)
  *H04N 21/858* (2011.01)
  *G11B 27/36* (2006.01)

(52) U.S. Cl.
  CPC ............ *G11B 27/034* (2013.01); *G11B 27/36* (2013.01); *H04N 21/431* (2013.01); *H04N 21/858* (2013.01)

(58) Field of Classification Search
  CPC ..... H04N 21/431; G11B 27/034; G11B 27/36
  See application file for complete search history.

(56) References Cited

U.S. PATENT DOCUMENTS

| 2009/0143881 A1* | 6/2009 | Smyers ................ G11B 27/034 700/90 |
| 2011/0126105 A1 | 5/2011 | Isozu |
| 2013/0004138 A1* | 1/2013 | Kilar .................. H04N 21/4756 386/230 |

FOREIGN PATENT DOCUMENTS

| CN | 101098329 A | 1/2008 |
| CN | 101382867 A | 3/2009 |
| CN | 101500125 A | 8/2009 |
| CN | 101778243 A | 7/2010 |
| CN | 101964790 A | 2/2011 |

(Continued)

OTHER PUBLICATIONS

International Preliminary Report for Application No. PCT/CN2015/072133 dated Jun. 16, 2016.

(Continued)

*Primary Examiner* — Hung Dang
*Assistant Examiner* — Girumsew Wendmagegn
(74) *Attorney, Agent, or Firm* — Morgan, Lewis & Bockius LLP (57) ABSTRACT

A video file and relation chain information of the video file are obtained. A video-file editing information is generated with the relation chain information. The video file is edited with the video-file editing information. The edited video file is played.

7 Claims, 4 Drawing Sheets

(56) References Cited

FOREIGN PATENT DOCUMENTS

| CN | 102073674 A | 5/2011 |
|----|-------------|--------|
| CN | 102572514 A | 7/2012 |

OTHER PUBLICATIONS

International Search Report for Application No. PCT/CN2015/072133 dated Apr. 28, 2015.
Chinese Office Action for Application No. 201310646296X dated Jun. 19, 2017, and an English concise explanation of relevance thereof.

\* cited by examiner

METHOD, DEVICE AND SYSTEM FOR PLAYING VIDEO

CROSS-REFERENCE TO RELATED APPLICATIONS

This application is a continuation of International Application No. PCT/CN2015/072133, filed Feb. 3, 2015. This application claims the benefit and priority of Chinese Application No. 201310646296.X, filed Dec. 4, 2013. The entire disclosures of each of the above applications are incorporated herein by reference.

FIELD

The present disclosure relates to information processing technologies and to a method, device, and system for playing video.

BACKGROUND

This section provides background information related to the present disclosure which is not necessarily prior art.

With the rapid development of computer technologies and network technologies, the Internet and Instant Messaging (IM) play an increasingly important role in people's daily life, study, and work. With the development of mobile Internet, there is more focus on the development of mobile. Society has entered into a highly developed information age. Competition patterns of enterprise have changed from single competition pattern to a complex competition pattern. The single competition pattern focuses on function and quality of a product. The complex competition pattern takes enterprise image, product, and brand as important means and main tendencies. Such pattern transition depends on the rapid development of displaying and interaction of modern medium.

In traditional interactive video activities, the degree of civilization in each time period in a certain area may be reflected by basic factors, such as media master, media contents, recipients of media contents, and media performance. All of these image factors may be taken as one kind of civilization in different degrees, and reflect marks of social age and economic age. In current media delivery methods, each media (such as web portals and video sites) is taken as media delivery carrier. For example, it is necessary to insert a script of a media system into a web page or video player. The media management system is in charge of delivering media. When a user browses a web page or video, the web page or player may automatically pull matched media. The script may then play media contents with a given playing format, and report the exposure rate of the media.

In current video media promotion, video content has already been created prior to being played. Customized content cannot be played for different users. Further, there is no sufficient interaction between video content and the user. Thus, playing videos is inefficient.

SUMMARY

This section provides a general summary of the disclosure, and is not a comprehensive disclosure of its full scope or all of its features.

A method for playing video, includes obtaining a video file, and relation chain information of the video file; generating video-file editing information with the relation chain information; editing the video file with the video-file editing information; and, playing the edited video file.

A device for playing a video file includes a processor, a memory, and a non-transitory memory. The non-transitory memory stores a computer program used for playing the video file; the memory loads the computer program from the non-transitory memory to be run, so as to form computer executable instructions, wherein the computer executable instructions are stored in an information obtaining unit, a video editing unit, and a video playing unit, the information obtaining unit obtains the video file, and relation chain information of the video file; the video editing unit generates video-file editing information with the relation chain information, edits the video file with the video-file editing information; and, the video playing unit plays the edited video file.

A system for playing video includes a terminal and a server. The terminal requests the server to provide a video file and relation chain information of the video file, generates video-file editing information with the relation chain information, edits the video file with the video-file editing information, and plays the edited video file; and, the server provides the video file, and the relation chain information of the video file to the terminal.

Based on the foregoing, it can be seen that, in the various embodiments of the present disclosure, obtaining a video file and relation chain information of the video file, generating video-file editing information with the relation chain information, editing the video file with the video-file editing information, and playing the edited video file is described. Thus, it can be seen that in the various embodiments of the present disclosure, video contents may be edited with the relation chain information, and then the edited video files may be displayed. Subsequently, a user may no longer receive video passively. Instead, social elements may be incorporated into video. The foregoing social elements may include a user's identity (ID), a user's nickname, a user's head portrait, or, participation of a user's buddies, concerned information of a user's buddy. Thus, user attention of the video, transmission of the video, and interaction efficiency may also be improved.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

To make the goals, technical methods, and benefits of the present disclosure more clear, detailed descriptions of the present disclosure will be provided in the following, accompanied with the attached figures.

Figure 1:
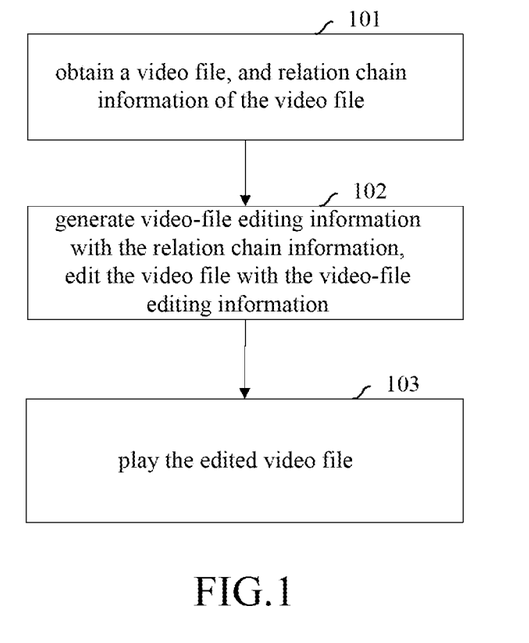
FIG. 1 is a flowchart illustrating a method for playing video, according to various embodiments of the present disclosure.

FIG. 1 is a flowchart illustrating a method for playing video, according to various embodiments of the present disclosure.

As shown in FIG. 1, the method may include the various blocks.

Block 101: Obtain a video file and relation chain information of the video file. The video file may be obtained from various sources of video file. The video file may be Internet media information in video format, such as Internet video advertisement. The relation chain information of the video file may also be obtained. For example, call an application programming interface (API), obtain relation chain information of a source user of the video file from a backend server, and/or, obtain relation chain information of an activity initiated by the source user of the video file from the backend server.

The source user of the video file refers to a user who provides the video file. For example, regarding a video file in the form of Internet advertisement, the source user of the video file may be an Internet advertiser. The source user of video file may initiate multiple activities, and each activity may possess a corresponding relation chain. The relation chain information may include attribute information, such as a user's ID, a user's nickname, a user's head portrait, participation, and concerned information of a user's buddies.

Block 102: Generate video-file editing information with the relation chain information, and edit the video file with the video-file editing information. According to various embodiments, generate the video-file editing information with the obtained relation chain information, and edit the video file with the video-file editing information, so as to display relation chain information in the video file. For example, a buddy's head portrait in the obtained relation chain information may be taken as the video-file editing information. Obtain a head-portrait display area location in the video file, generate a head-portrait cover floating layer over the head-portrait display area location in the video-file playing area, and fill the buddy's head portrait into the head-portrait cover floating layer, so as to cover the head portrait in the video file. Subsequently, a character image in the original video file may be replaced with the buddy's head portrait in the relation chain, so as to create a novel interactive pattern.

The head-portrait display area location in the video file may be obtained through various methods. For example, identify the head portrait in the video-file playing area with automatic pattern recognition or manual marking. Calculate coordinate information for the head portrait in the video-file playing area, so as to obtain the head-portrait display area location.

Figure 2:
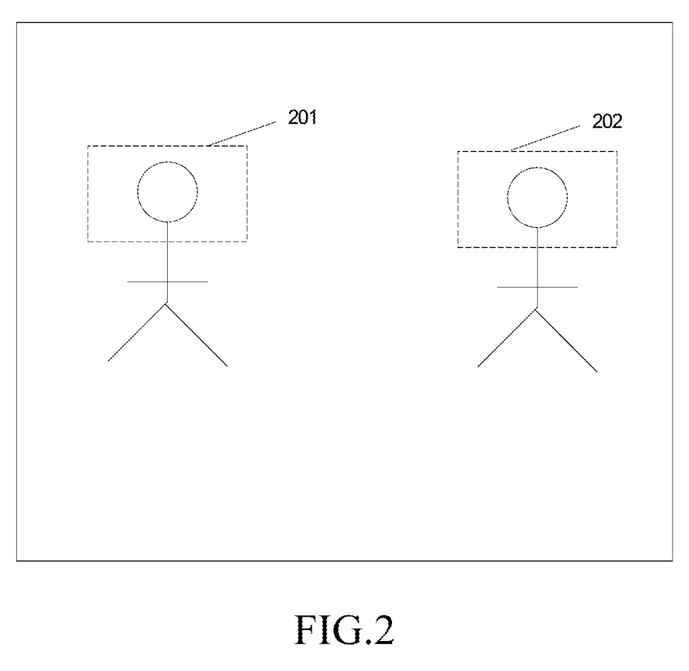
FIG. 2 is a diagram illustrating how to play video, according to various embodiments.

FIG. 2 is a diagram illustrating how to play video, according to various embodiments of the present disclosure. As shown in FIG. 2, there are two characters in the video-file playing area. Meanwhile, there is a head-portrait cover floating layer over the head of each character image. The head-portrait cover floating layer is denoted with a dashed box. That is, the character image in the left hand possesses head-portrait cover floating layer 201. The character image in the right hand possesses head-portrait cover floating layer 202. Head portraits of buddies may be respectively filled into head-portrait cover floating layers 201 and 202, so as to enable buddies to participate in the video interaction.

In another example, take a buddy's nickname in the obtained relation chain information as the video-file editing information, determine a text display area (e.g., text display area is adjacent to character image in the video) in the video-file playing area and generate a text display floating layer in the text display area, and fill a buddy's nickname into the text display floating layer. Thus, the buddy's nickname may be displayed around the character image in the video-file playing area in the form of text, so as to create a novel interaction pattern.

In addition, take a buddy's comments in the obtained relation chain information as the video-file editing information, determine the text display area (e.g., in a preset area of the video) in the video-file playing area and generate a text display floating layer in the text display area, and fill the buddy's comments into the text display floating layer. Thus, the buddy's comments may be displayed in the video-file playing area in the form of text, so as to create a novel interaction pattern.

Figure 3:
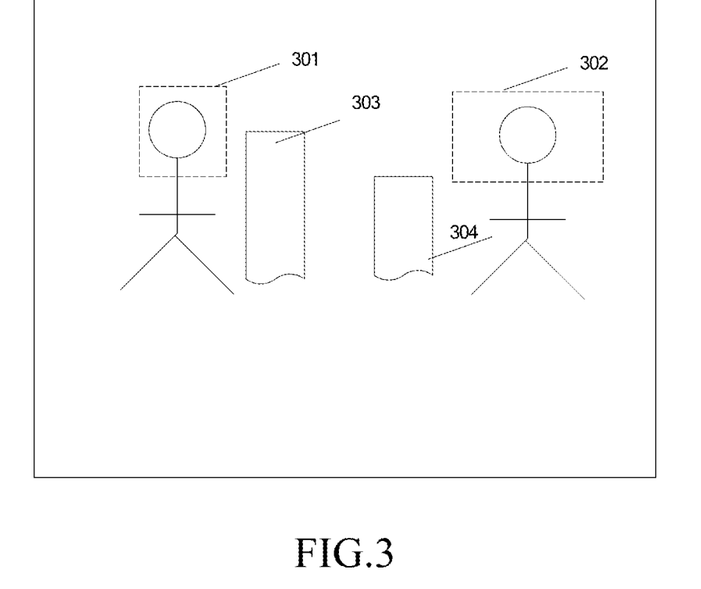
FIG. 3 is a diagram illustrating how to play video, according to various embodiments.

FIG. 3 is a diagram illustrating how to play video, according to various embodiments of the present disclosure. As shown in FIG. 3, there are two character images in the video-file playing area. There is a head-portrait cover floating layer over the head of each character image. The head-portrait cover floating layer is denoted with dashed box. That is, the character image in the left hand possesses head-portrait cover floating layer 301. The character image in the right hand possesses head-portrait cover floating layer 302. Respectively fill head portraits of buddies into head-portrait cover floating layers 301 and 302, so as to enable buddies to participate in the video interaction.

There are two text display areas in the video-file playing area, e.g., text display area 303 of the character image in the left hand, and text display area 304 of the character image in the right hand. A first user's nickname or comments may be displayed in text display area 303. A second user's nickname or comments may be displayed in text display area 304. For example, the first and second users are in the relation chain. Thus, a buddy's comments and nickname may be displayed in the video-file playing area in the form of text, so as to create a novel interaction pattern.

The foregoing describes modification patterns for floating layer generated in the video-file playing area. The modification process has been described in detail, by taking the buddy's head portrait as an example. One with ordinary skill in the art may learn that such descriptions are illustrative, which are not used for limiting implementation modes of the present disclosure.

A relation-chain-information display floating layer may also be generated around the video-file playing area.

According to various embodiments, the video-file editing information may include at least one of a buddy's head portrait, a buddy's nickname, or a buddy's comments. The process for editing the video file with the video-file editing information may include generating a relation-chain-information display floating layer around the video-file playing area and displaying the video-file editing information in the relation-chain-information display floating layer.

For example, generate relation-chain-information display floating layer in the lower part of the video-file playing area and display the video-file editing information in the relationchain-information display floating layer. The foregoing video-file editing information may include a user's head portrait, a user's comments, and so on. The video-file editing information may be played dynamically and continuously. Alternatively, the video-file editing information may be updated periodically, according to a predetermined time interval.

Figure 4:
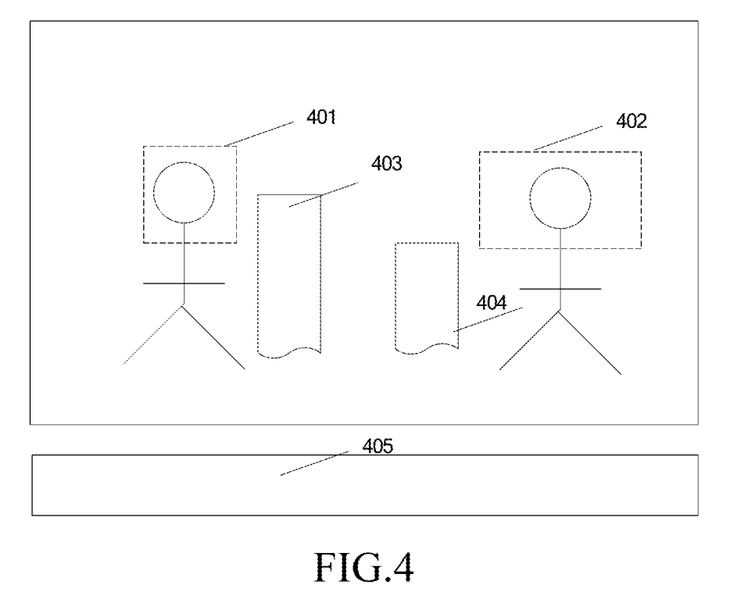
FIG. 4 is a diagram illustrating how to play video, according to various embodiments.

FIG. 4 is a diagram illustrating how to play video, according to various embodiments of the present disclosure. As shown in FIG. 4, there are two character images in the video-file playing area. There is a head-portrait cover floating layer over the head of each character image. The head-portrait cover floating layer is denoted with dashed box. That is, the character image in the left hand possesses head-portrait cover floating layer 401. The character image in the right hand possesses head-portrait cover floating layer 402. Respectively fill head portraits of buddies into head-portrait cover floating layers 401 and 402, so as to enable the buddies to participate in the video interaction.

There are two text display areas in the video-file playing area, e.g., text display area 403 of the character image in the left hand, and text display area 404 of the character image in the right hand. For example, a first user and a second user are in the relation chain. Display a first user's nickname or comments in text display area 403. Display a second user's nickname or comments in text display area 404.

Further, relation-chain-information display floating layer 405 (in the lower part of the video-file playing area in FIG. 4) is beyond the video-file playing area. Relation chain information may be displayed in relation-chain-information display floating layer 405. The foregoing relation chain information may include a user's head portrait, a user's comments, and so on. The relation chain information may be played dynamically and continuously in relation-chain-information display floating layer 405. Alternatively, the relation chain information may also be updated periodically, according to a predetermined time interval.

Block 103: Play the edited video file. The edited video file may be played with a traditional video media promotion, and/or, mobile video media promotion. In the video media promotion, the played video file is mainly in fly, swf format. However, in the mobile video media promotion, the played video file is mainly in a streaming media file format, such as, gif dynamic picture, 3gp, mp4, due to various subjective and objective factors of network. The video media promotion mainly employs before-video patch media promotion and after-video patch media promotion, video-paused media promotion. However, the mobile video media promotion mainly inserts and plays video with "fragment time". The "fragment time" refers to time when a mobile phone user opens or quits a mobile application.

According to various embodiments, the method may further include displaying a floating layer component around the video-file playing area. The floating layer component may include at least one of: the ID of the video file, two-dimension code, promotion information, link information of microblog activity page, or a control associated with the relation chain. The control associated with the relation chain may include at least one of: a trigger control indicating to forward to a buddy, a control receiving a buddy's comments, a control prompting a buddy to pay attention, or a control displaying forwarding number. Thus, after setting a control associated with relation chain in the floating layer component, a user may be facilitated to forward a video file to other buddies, and transmission of video file may also be facilitated.

In the video interaction method provided according to various embodiments, after introducing a relation chain model to video, transmission efficiency and click rate of media promotion may be improved. For example, after placing the relation chain information on common banner media, call an API interface of SAC platform in material to obtain a corresponding relation chain, or directly cover social layer to implement a corresponding social promotion function of mandatory advertising. Playing duration supported by current video media promotion is generally 15 s or 30 s. Thus, displayed contents may be extensive and sufficient.

When the implementation mode of the present disclosure is applied to microblog field, it is necessary for current video social material in a system to bind a microblog ID of the video source, or bind a corresponding microblog activity ID. The video source may be selected with two methods during displaying process, as follow.

In one method: Call a social API interface in media information. Fill the obtained microblog activity information of the media, a related buddy's comments, a participated buddy's nickname, and head-portrait related information into advertisement creative contents dynamically. Since the playing duration of video is relatively longer, there is sufficient time to describe a story, such that media promotion originality may be more flexible and attractive.

In a second method: After covering social layer, a customized social advertisement template pattern may be achieved by common video media. Microblog activity information, a related buddy's comments, a participated buddy's nickname, and head-portrait related information may be displayed on the social layer. Multiple sets of templates may be provided. Increased advertisement interactions may also be supported, e.g., favor, participate, or expression. Related information is visible to buddies. The related information may also be synchronous to microblog information of participators.

Based on the foregoing analysis, various embodiments of the present disclosure also provide a device for playing video.

Figure 5:
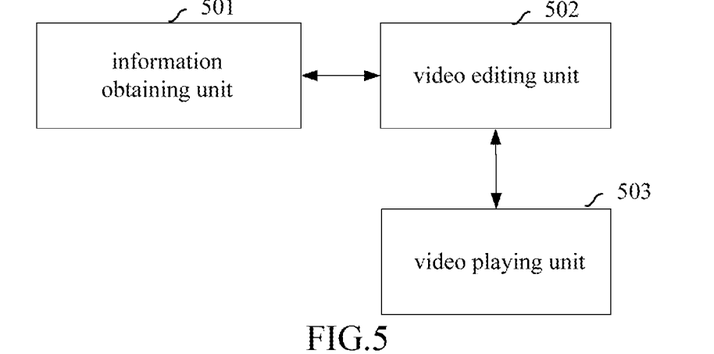
FIG. 5 is a diagram illustrating structure of a device for playing video, according to various embodiments.

FIG. 5 is a diagram illustrating structure of a device for playing video, according to various embodiments of the present disclosure. As shown in FIG. 5, the device includes an information obtaining unit 501, a video editing unit 502, and a video playing unit 503. The information obtaining unit 501 obtains a video file, and relation chain information of the video file. The video editing unit 502 generates video-file editing information with the relation chain information, and edits the video file with the video-file editing information. The video playing unit 503 plays the edited video file. According to various embodiments, the video-file editing information may include a buddy's head portrait.

The video editing unit 502 further obtains a head-portrait display area location in the video file, generates a head-portrait cover floating layer within the head-portrait display area location, and fills the buddy's head portrait into the head-portrait cover floating layer, so as to cover the head portrait in the video file. According to various embodiments, the video-file editing information may include a buddy's nickname, and/or, a buddy's comments.

The video editing unit 502 further determines text display area in the video file, generates text display floating layer in the text display area, and fills the buddy's nickname, and/or, the buddy's comments into the text display floating layer.

According to various embodiments, the video-file editing information may include at least one of a buddy's head portrait, a buddy's nickname, or a buddy's comments.

The video editing unit 502 further generates relation-chain-information display floating layer around the video-file playing area, and displays the video-file editing information in the relation-chain-information display floating layer.

According to various embodiments, the information obtaining unit 501 further calls an API interface, so as to obtain relation chain information of a source user of the video file, and/or, relation chain information of an activity initiated by the source user of the video file.

According to various embodiments, the video playing unit 503 further displays floating layer component around the video-file playing area, and the floating layer component may include at least one of: the ID of the video file, two-dimension code, promotion information, link information to a microblog activity page, or a control related with the relation chain. The control related with the relation chain may include at least one of a trigger control indicating to forward to a buddy, a control receiving a buddy's comments, a control prompting a buddy to pay attention, and a control displaying forwarding number.

Figure 6:
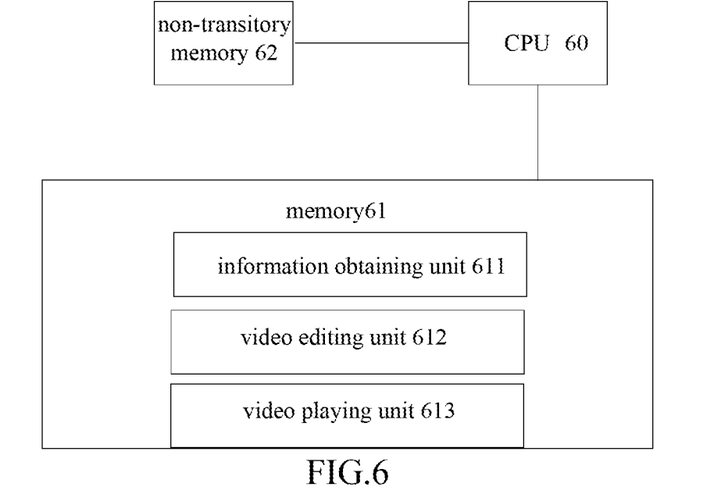
FIG. 6 is a diagram illustrating structure of a device for playing video, according to various embodiments.

FIG. 6 is a diagram illustrating structure of a device for playing video, in accordance with various embodiments of the present disclosure. As shown in FIG. 6, the device may include a central processing unit (CPU) 60, a memory 61, and a non-transitory memory 62. The non-transitory memory 62 stores a computer program, which is used for playing video. The CPU 60 may load the computer program from non-transitory memory 62 to the memory 61 to be run, so as to form computer executable instructions.

The foregoing computer executable instructions may be stored in an information obtaining unit 611, a video editing unit 612, and a video playing unit 613. The information obtaining unit 611 obtains a video file and relation chain information of the video file. The video editing unit 612 generates video-file editing information with the relation chain information and edits the video file with the video-file editing information. The video playing unit 613 plays the edited video file. According to various embodiments, the video-file editing information may include a buddy's head portrait.

The video editing unit 612 further obtains a head-portrait display area location in the video file, generates a head-portrait cover floating layer over the head-portrait display area location, and fills the buddy's head portrait into the head-portrait cover floating layer, so as to cover the head portrait in the video file. According to various embodiments, the video-file editing information may include a buddy's nickname, and/or, a buddy's comments. The video editing unit 612 further determines a text display area in the video file, generates a text display floating layer on the text display area, and fills the buddy's nickname, and/or, the buddy's comments into the text display floating layer.

According to various embodiments, the video-file editing information may include at least one of: a buddy's head portrait, a buddy's nickname, or a buddy's comments. The video editing unit 612 further generates relation-chain-information display floating layer around the video-file playing area and displays the video-file editing information on the relation-chain-information display floating layer.

According to various embodiments, the information obtaining unit 611 further calls an API interface, so as to obtain relation chain information of a source user of the video file, and/or, relation chain information of an activity initiated by the source user of the video file.

According to various embodiments, the video playing unit 613 further displays a floating layer component around the video-file playing area, and the floating layer component may include at least one of the ID of the video file, two-dimension code, promotion information, link information to a microblog activity page, or a control related with the relation chain.

The control related with the relation chain may include at least one of a trigger control indicating to forward to a buddy, a control receiving a buddy's comments, a control prompting a buddy to pay attention, or a control displaying forwarding number.

Based on the foregoing detailed analysis, various embodiments of the present disclosure also provide a system for playing video, which is in a local terminal and a network-side server. The terminal requests the server to provide a video file and relation chain information of the video file. The server provides the terminal with the video file and the relation chain information of the video file. The terminal further generates video-file editing information with relation chain information, edits the video file with the video-file editing information, and plays the edited video file.

The device for playing video according to various embodiments of the present disclosure may be integrated into various terminals. The various terminals may include, but are not limited to, feature phone, smart phone, handheld computer, personal computer (PC), tablet PC, personal digital assistant (PDA), and so on.

Although the foregoing describes various examples of the terminal, one with ordinary skill in the art may learn that the foregoing lists are to describe general goals, which are not for use in limiting the protection scope of the present disclosure. The terminal may be applicable to any smart phone operating system (OS), which may include, but is not limited to, Palm OS, Symbian, Windows mobile, Linux, Android, iPhone OS, Black Berry OS 6.0, Windows Phone series, and so on.

The terminal may employ the Android OS, and each version of Android, which may include, but are not limited to, Android Beta, Android 1.0, Android 1.5, Android 1.6, Android 2.0/2.1, Android 2.2, Android 2.3, Android 3.0, Android 4.0, Jelly Bean, Android 4.1, and so on.

The foregoing describes specific versions of the Android platform, and one with ordinary skill in the art may learn that various embodiments of the present disclosure are not limited by the foregoing versions listed. Various embodiments of the present disclosure may also be applicable to any version based on Android software structure.

The method and device for playing video provided by various embodiments of the present disclosure may be implemented with various patterns.

For example, the method for playing video may be written as a plug-in program following a standardized API, or may be encapsulated into an application program to be downloaded and used by a user. The foregoing plug-in program may be installed on a PC, or a mobile terminal. When being written as a plug-in program, the method for playing video may be implemented with various plug-in formats, such as ocx, dll, cab. The method for playing video provided by various embodiments of the present disclosure may also be achieved with various technologies, such as Flash plug-in, RealPlayer plug-in, multimedia messaging service (MMS) plug-in, musical instrument digital interface (MIDI) stave plug-in, and Active X plug-in.

The method for playing video provided by various embodiments of the present disclosure may be stored in various storage mediums, by using instruction or instruction set. These storage mediums may include, but are not limited to, floppy disk, compact disk (CD), digital video disk (DVD), hard drive, flash, U disk, compact flash (CF) card, secure digital memory card (SD) card, multimedia card (MMC) card, smart media (SM) card, memory stick, extreme digital-picture card (XD) card, and so on.

The method for playing video provided by various embodiments of the present disclosure may be applied to Nand flash-based storage medium, such as U disk, CF card, SD card, secure digital high capacity (SDHC) card, MMC card, SM card, memory stick, xD card, and so on.

In view of above, in the various embodiments of the present disclosure, obtaining a video file and relation chain information of the video file, generating video-file editing information with the relation chain information, editing the video file with the video-file editing information, and playing the edited video file is described. Thus, it can be seen that in the various embodiments of the present disclosure, relation chain information may be combined to edit video contents. The edited video file may then be displayed. Thus, a user may no longer receive video passively. Instead, social elements may be introduced to video, such as a user's ID, a user's nickname, a user's head portrait, or participation information of a user's buddies, attention information of a user's buddies, and so on. Subsequently, user attention and transmission of video may be improved, and interaction efficiency may also be improved.

The foregoing are preferred examples of the present disclosure, which is not for use in limiting protection scope of the present disclosure. Any modification, equivalent replacement and improvement made within the spirit and principle of the present disclosure should be covered by the protection scope of the present disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

What is claimed is:

1. A method for playing video, comprising:
   at a computing device having a processor and memory storing a plurality of computer executable instructions to be executed by the processor:
   obtaining, from a server, a video file requested by a user of the computing device, and relation chain information of the video file, wherein the relation chain information includes attribute information of the user and concerned information of one or more buddies of the user;
   generating video-file editing information with the relation chain information wherein the video-file editing information comprises one or more of: a buddy's head portrait, a buddy's nick name and a buddy's comments related to the video file and collected by the server;
   editing the video file with the video-file editing information, further including:
   obtaining a head-portrait display area location in the video file;
   generating a head-portrait display floating layer using a buddy's head portrait; and
   generating a text display floating layer including the buddy's comments related to the video file; and
   playing the edited video file, further including:
   covering the head-portrait display area location in the video file with the head-portrait display floating layer; and
   displaying the text display floating layer adjacent to the buddy's head-portrait in the video file.

2. The method according to claim 1, wherein obtaining the relation chain information of the video file comprises:
   calling an application programming interface (API) interface, so as to obtain the relation chain information of a source user of the video file, and/or, obtain the relation chain information of an activity initiated by the source user of the video file.

3. The method according to claim 1, further comprising:
   displaying a floating layer component around the video-file playing area, wherein the floating layer component comprises at least one of:
   the identity (ID) of the video file, a two-dimension code, promotion information, link information to a microblog activity page, or a control of a relation chain;
   wherein the control of the relation chain comprises at least one of:
   a trigger control indicating to forward to a buddy, a control receiving a buddy's comments, a control prompting a buddy to pay attention, or a control displaying forwarding number.

4. A device for playing a video file, which at least comprises a processor, a memory and a non-transitory memory, wherein
   the non-transitory memory is to store a computer program used for playing the video file;
   the memory is to load the computer program from the non-transitory memory to be run, so as to form computer executable instructions, wherein the computer executable instructions are stored in an information obtaining unit, a video editing unit and a video playing unit,
   the information obtaining unit is to obtain, from a server, the video file requested by a user of the device, and relation chain information of the video file, wherein the relation chain information includes attribute information of the user and concerned information of one or more buddies of the user;
   the video editing unit is to generate video-file editing information with the relation chain information, wherein the video-file editing information comprises one or more of: a buddy's head portrait, a buddy's nick name and a buddy's comments related to the video file and collected by the server, edit the video file with the video-file editing information, further including:
   obtain a head-portrait display area location in the video file;
   generate a head-portrait display floating layer using a buddy's head portrait; and
   generate a text display floating layer including the buddy's comments related to the video file; and, the video playing unit is to play the edited video file, further including:
  cover the head-portrait display area location in the video file with the head-portrait display floating layer; and
  display the text display floating layer adjacent to the buddy's head-portrait in the video file.

5. The device according to claim 4, wherein the information obtaining unit is further to call an application programming interface (API) interface, so as to obtain the relation chain information of a source user of the video file, and/or, the relation chain information of an activity initiated by the source user of the video file.

6. The device according to claim 4, wherein the video playing unit is further to display a floating layer component around a video-file playing area, and the floating layer component comprises at least one of:
  the identity (ID) of the video file, a two-dimension code, promotion information, link information to a microblog activity page, or a control of a relation chain;
  wherein the control of the relation chain comprises at least one of:
  a trigger control indicating to forward to a buddy, a control receiving a buddy's comments, a control prompting a buddy to pay attention, or a control displaying forwarding number.

7. A system for playing video, comprising a terminal and a server, wherein the terminal is to
  request the server to provide a video file requested by a user of the terminal and relation chain information of the video file, wherein the relation chain information includes attribute information of the user and concerned information of one or more buddies of the user,
generate video-file editing information with the relation chain information wherein the video-file editing information comprises one or more of: a buddy's head portrait, a buddy's nick name and a buddy's comments related to the video file and collected by the server,
edit the video file with the video-file editing information, further including:
  obtain a head-portrait display area location in the video file;
  generate a head-portrait display floating layer using a buddy's head portrait; and
  generate a text display floating layer including the buddy's comments related to the video file, and
play the edited video file, further including:
  cover the head-portrait display area location in the video file with the head-portrait display floating layer; and
  display the text display floating layer adjacent to the buddy's head-portrait in the video file.

* * * * *